Aug. 20, 1929. O. E. BORNHAUSER. Re. 17,406

REFRIGERATING APPARATUS.

Original Filed Feb. 19, 1917

3 SHEETS—SHEET 1.

WITNESSES

Jas. K. McCathran

H. T. Chapman.

INVENTOR

Otto E. Bornhauser,

BY E. G. Siggers

ATTORNEY

Aug. 20, 1929. O. E. BORNHAUSER. Re. 17,406

REFRIGERATING APPARATUS.

Original Filed Feb. 19, 1917

3 SHEETS—SHEET 2.

WITNESSES

Jas. K. McCathran

F. T. Chapman.

INVENTOR

Otto E. Bornhauser,

BY E. G. Siggers

ATTORNEY

Aug. 20, 1929. O. E. BORNHAUSER. REFRIGERATING APPARATUS. Re. 17,406

Original Filed Feb. 19, 1917 3 SHEETS—SHEET 3.

WITNESSES

Jas. K. McCathran

F. T. Chapman.

INVENTOR

Otto E. Bornhauser,

BY E. G. Siggers

ATTORNEY

Reissued Aug. 20, 1929. Re. 17,406

UNITED STATES PATENT OFFICE.

OTTO E. BORNHAUSER, OF SANDUSKY, OHIO, ASSIGNOR, BY MESNE ASSIGNMENTS, TO FRIGIDAIRE CORPORATION, OF DAYTON, OHIO, A CORPORATION OF DELAWARE.

REFRIGERATING APPARATUS.

Original No. 1,255,286, dated February 5, 1918, Serial No. 149,516, filed February 19, 1917. Application for reissue filed April 28, 1928. Serial No. 273,740.

This invention has reference to refrigerating apparatus of the intermittent absorption type in which the same liquid container, usually termed generator-absorber, acts alternately as a generator and as an absorber; and its object is to provide an apparatus of this character, which may be economically constructed and operated and is susceptible of manufacture in large or small units, and is especially applicable for private installation as well as being adapted for large installations.

In accordance with the invention ammonia water is heated in a suitable container or generator-absorber to drive off the ammonia gas, which, carrying more or less water in the shape of vapor, is preliminarily cooled to condense the watery vapor, so that the ammonia gas becomes dried or free from water. The dry gas is chilled under pressure to condense it to liquid form and is conducted to a container through check valves, so that the condensed or liquefied gas cannot return to the generator-absorber when the latter becomes cooled. In the liquefied ammonia receiver, float mechanism is installed and is arranged to control the flow of the heating agent, usually gas, which is employed to heat the ammonia water or aqua ammonia in the preliminary driving off of the ammonia gas therefrom. When a determined supply of liquid ammonia has accumulated in the receiver, it is permitted to pass to an expansion chamber, where by expansion a chilling effect is produced to be utilized for refrigerating purposes. The expanded ammonia then finds its way back to the generator-absorber to be reabsorbed by the water therein.

When the supply of liquefied ammonia becomes low the heating agent is again turned on, and by means of a pilot flame is ignited, whereupon the distilling of the ammonia gas and the chilling and accumulation thereof for further utilization for refrigerating purposes is caused.

Such cycle of operations proceeds indefinitely and is entirely automatic in action. The refrigerating chamber is also provided with a float and devices controlled thereby for determining the flow of ammonia into the refrigerating chamber.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications come within the scope of the appended claims.

Figure 1:
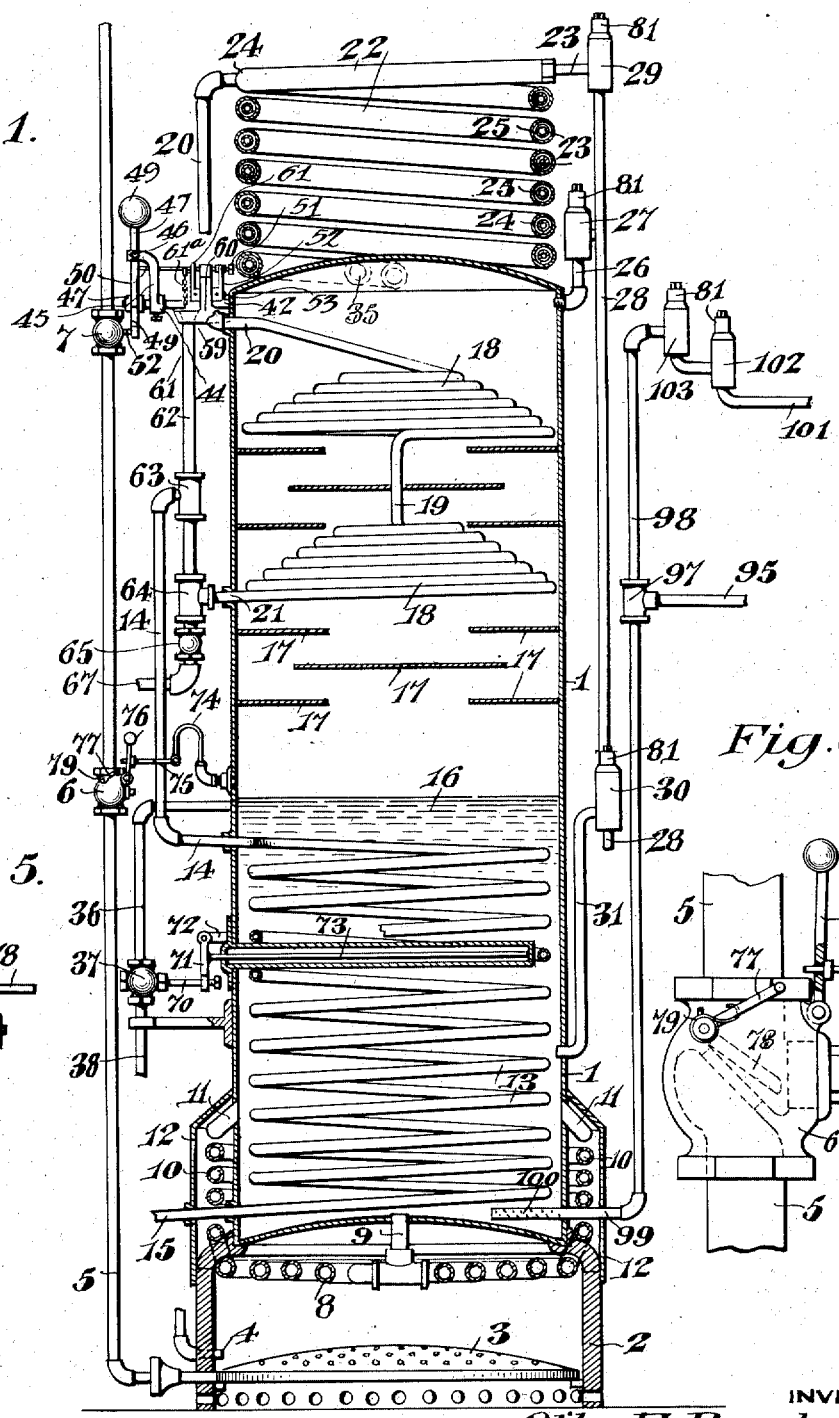
Fig. 1 is a vertical diametric section with some parts in elevation, showing the heating and condensing mechanism and parts associated therewith.
Figure 5:
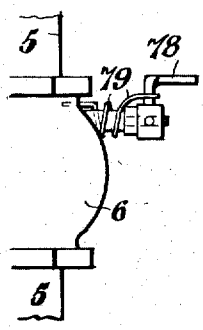
Figs. 5 to 13, inclusive, are views, some in elevation and some in section, of various details of construction of the apparatus.
Figure 6:
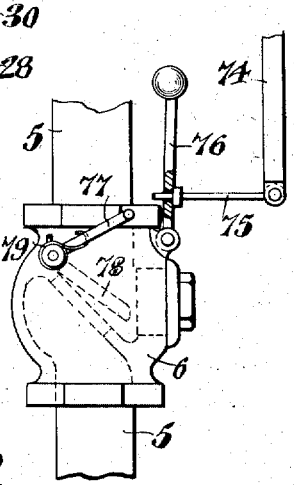

Referring to the drawings, there is shown a generator-absorber casing 1, usually though not necessarily of elongated cylindrical form and mounted in an upright position upon a base 2. Located within the base 2 at a low point is a burner 3 which may be considered as of a type permitting the use of gas as a fuel, and associated with the burner 3 is a small burner 4 for a pilot flame. The burner 3 is supplied with fuel, usually gas, through a pipe 5, which in the construction shown rises along the casing 1 and includes valves 6 and 7 to be hereinafter referred to. Within the base 2 and above the burner 3 are coils 8 of pipe having a connection 9 opening into the interior of the casing 1 through the bottom thereof, and the coils 8 are provided with continuations 10 about the lower portion of the same above the base 2 and ultimately opening, as indicated at 11, into the casing 1 above but adjacent to the bottom thereof. The coils 10 are enclosed in a sheathing 12 exterior to the bottom portion of the casing 1 and rising from the base 2.

Within the casing 1 and confined to the lower portion thereof is a coil 13 of piping having terminal portions 14, 15, respectively, extending through the casing to the exterior thereof. The casing 1 when in operation contains a body 16 of ammonia water (aqua ammonia) rising to a level above the top of the coil 13.

In order that the relative dimensions of the parts may be more or less appreciated, it may be stated that in an actual construction the depth of the liquid 16 is about fourteen inches, but such dimensions may be departed from to a considerable extent without affecting the invention, the size of the plant very largely determining dimensions.

The casing 1 rises to a considerable height above the level of the liquid 16 and within such portion of the casing is a separator for condensing and separating out the entrained water from the ammonia vapor or gas, consisting in the present instance, of baffles 17 and coils 18 of piping, such coils 18 being connected in series by a pipe 19 and having terminal portions 20, 21, respectively, leading through the casing 1 to the exterior thereof.

Mounted on top of the casing is a water jacketed condenser coil 22 comprising piping 23 and a sheathing 24, the latter being in spaced relation to and enclosing the piping 23, so as to provide a passageway 25 constituting a duct for water, the piping 23 being designed to conduct ammonia.

Near the top of the casing 1 there is branched off a pipe 26 connecting through a check valve 27 to another pipe 28, which latter is in turn connected to a check valve 29 leading to one end of the pipe 23, such being the upper end of the pipe 23 in the installation shown in the drawings. The end 20 of the coils 18 is connected to the sheathing 24 so as to open into the duct 25 between the sheathing 24 and the pipe 23. The pipe 28 is continued on the side of the check valve 27 remote from the check valve 29 to another check valve 30, which latter is connected by a pipe 31 to the interior of the casing 1 at a point below the level of the liquid 16 so as to discharge into the liquid to conduct thereto any drippings or leakage which may occur.

Mounted on a bracket 32 or other support secured to one side of the casing 1 is another casing 33 designed to receive the liquid ammonia from the condenser, which may be considerably smaller than the casing 1 and contains a coil of pipe 34, the latter being connected at its upper end by a pipe 35 to the lower end of the duct 25. At the lower end the coil 34 is connected by a pipe 36 exterior to the casing 33 to a valve 37, which latter connects to a water supply pipe 38. The valve 37 is automatic in its action and shuts off and lets on the water supply to the water circulating system of the apparatus as will be hereinafter more particularly described.

Figures 2, 7, 8, 9:
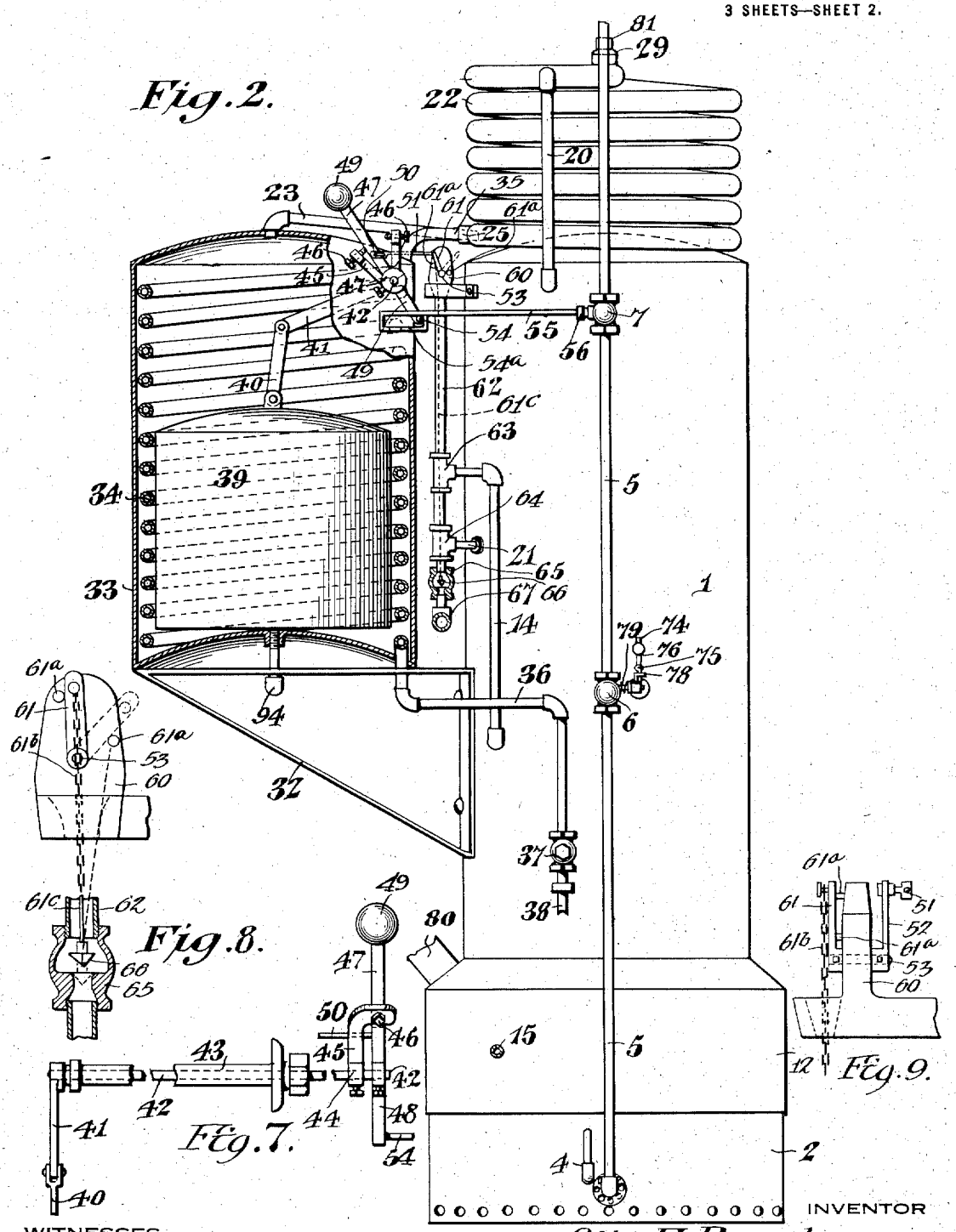
Fig. 2 is an elevation of the structure of Fig. 1 viewed from the left hand side thereof and showing the receiver for containing liquid ammonia, in vertical diametric section, such receiver being hidden in Fig. 1.
Figure 12:
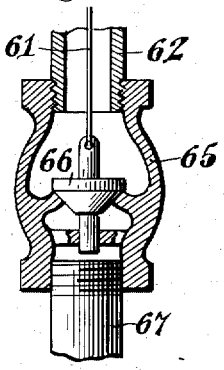

Within the casing 33 is a float 39 connected by a link 40 to a lever 41 in turn connected to a rock shaft 42 shown in Figs. 2 and 7. The rock shaft 42 is mounted in a sleeve 43 made fast to and projecting through one wall of the casing 33 near the upper end of the casing, such mounting of the shaft 42 preventing leakage, but at the same time permitting rocking of the shaft and the attachment of certain structures to the shaft exterior to the casing 33. Outside of the casing 33 the shaft 42 carries a collar 44 with divergent arms 45 each carrying at the free end an adjustable set screw 46, as shown in Figs. 1, 2, 7. On the shaft 42 is a weighted lever 47, 48, 49, of the first order mounted between its two ends on the shaft and free to rock thereon. The upper arm 47 of the lever which carries the weight 49, is provided with a laterally projecting pin 50, to engage the elongated eye of the connecting rod 51, the other end of which is jointed to the crank arm 52, on one end of the rock shaft 53; mounted in suitable bearings in the supporting bracket 60 secured to the casing 1; on the other end of said rock shaft is another upwardly extending radial arm 61, which rocks with shaft 53, said rocking motion being limited by properly located stops $61^a$, $61^a$, on the bracket 60 between which the arm 61 vibrates. To the free extremity of the radial arm 61, is connected, by a chain or other flexible coupling $61^b$ a rod $61^c$ which extends down through a stand pipe or guide tube 62, and couplings 63, 64 included in said tube, to a valve casing 65 shown separately in Fig. 12, enclosing a movable valve member 66, to which rod $61^c$ is connected. The valve casing 65 discharges into a waste pipe 67 which may lead to any suitable point of disposal.

Figure 13:
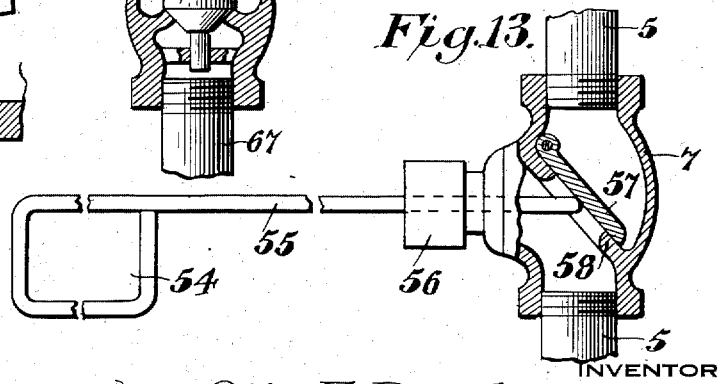

The lever arm 48 carries at its outer end a laterally projecting pin 54, which extends through an eye $54^a$ at one end of a rod 55 extending through a stuffing box 56 in the gas valve 7, the latter being shown in detail in Fig. 13. The valve 7 is a check valve having a movable valve member 57 associated with a valve seat 58. The valve member 57 is in the path of the rod 55 which enters the valve 7 through the stuffing box 56. When the shaft 42 is rocked in one direction one of the set screws 46 on a corresponding arm 45 engages the upper arm 47; thus rocking the arm 47 until the weight 49 passes the center of gravity. As soon as this occurs the arm 47 is impelled by the weight 49 to assume the opposite tilted position, the rocking movement of the arm 47 at the same time causing the pin 54 within the eye $54^a$, which latter may be somewhat elongated, to actuate the rod 55 in a direction to either permit the valve member 57 to close or to force this valve member to the open position, in accordance with the direction of movement of the arm 47. In the position of the arm 47 shown in Fig. 2 the valve member 57 is in the open position, the float 39 being lowered. When the float 39 is raised the rock shaft 42 is propelled in a direction to cause the arm 47 to move from the position shown in Fig. 2 to the opposite position of tilting, causing the closure of the valve member 57, wherefore when there has been an accumulation of liquid in a manner to be described within the casing 33 sufficient to lift the float 39 to an extent causing the closure of the valve member 57, the passage of gas through the pipe 5 is cut off at the valve 7. When the float 39 lowers to an extent to return the arm 47 to the first position, the valve member 57 is moved to the open position, and hence gas may again flow through the burner 3 provided it is not otherwise cut off. Under some circumstances the flow of gas to the burner is cut off at the valve 6, which is a member of an emergency or safety automatic cut-off of thermally controlled type located at that point, as will be hereinafter more fully described.

It will be noted that whenever the gas valve 7 is open—in which position it is shown in Fig. 2—the water valve 65 is also open as shown in the same figure; and whenever the gas valve 7 is closed the water valve 65 will be closed also. The object of the concurrent opening and closing of these two valves will be presently explained.

Figure 11:
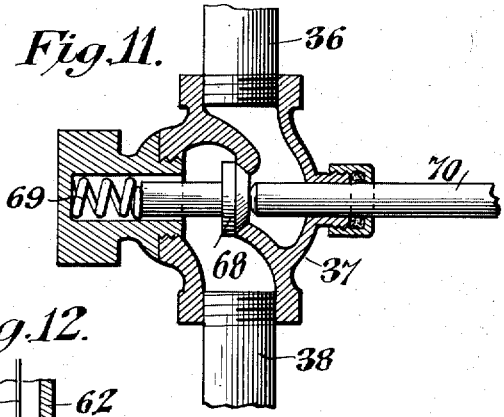
Figure 4:
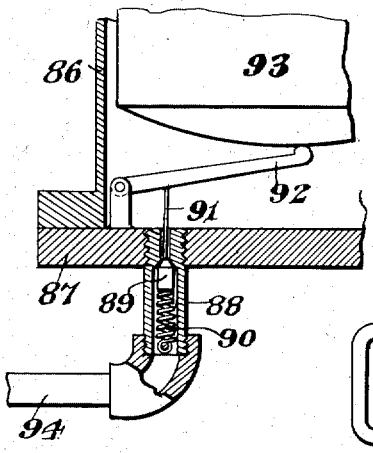
Fig. 4 is a section on a larger scale than Fig. 3 and illustrating in detail a portion of the refrigerating chamber and float located therein.

The valve 37 which controls the supply of water to the apparatus is shown separately in Fig. 11 and the casing of this valve encloses a movable valve member 68 urged toward its seat by a spring 69. Engaging the valve member 68 is a rod 70 entering the valve casing from the exterior and under the control of a lever 71 carried by a bracket 72 on the casing 1. The lever 71 is in turn under the control of a thermostat 73 located within the casing 1 in position to be immersed in the liquid 16, so that the valve 68 is forced open when the liquid 16 is heated to a predetermined extent, and is allowed to close under the action of the spring 69 when the liquid 16 is cooled below a predetermined degree. When the valve member 68 is opened, cooling water may flow through the pipe 38 by way of the valve 37 to the pipe 36, thence through the coil 34, and by way of the pipe 35 to the duct 25 leaving the latter by way of the pipe 20 to the coils 18 in series, and by the end 21 of the coils 18 and through the coupling 64 to the waste pipe or outlet 67.

A branch pipe 14 from a coupling 63 on the stand pipe or guide tube 62 connects the cooling coil 13 in the generator-absorber with the water supply system at a point beyond the valve 65 relatively to the direction of travel of the entering water. When the valve 65 is open, as shown in Fig. 2 and in full lines in Fig. 8, (which is when the generator-absorber is acting as a generator) the coil 13 is cut out of the water circulating system, the water circuit in such case being from the water supply pipe 36 through the coil 34, the water jacketed condenser coil 22, and the separator coils 18 successively, to the coupling 64, and thence directly through the open valve 65, to discharge outlet 67. When however the valve 65 is closed, as shown in dotted lines in Fig. 8 (which is when the generator-absorber is acting as an absorber) access to the outlet 67 is cut off, and the water consequently passes up through the stand pipe 62, to coupling 63 and thence by branch 14 to cooling coil 13, through which it passes, discharging at 15. Thus the cooling coil 13 in the generator-absorber, is in a by-pass from the water circulating system, which by-pass is thrown into or out of circuit with that system according as the generator-absorber is acting as an absorber or as a generator.

The automatic safety gas cut-off of thermally controlled type, may be of any of the known forms of such cut-offs used for various purposes in the industrial arts. But as in my apparatus it is used only as an emergency or safety device to operate only in case of dangerous or abnormally high pressures in the generator-absorber, and as in such case the excess of pressure is generally due to causes which demand the personal attention of the operator, I prefer to so organize and arrange the parts of the device that the valve when once closed remains closed until it is manually reset even though in the meantime the pressure shall have been reduced below the danger line, thus compelling the attendance and attention of the operator before the apparatus can again start. A device having this characteristic is illustrated in Figs. 1, 2, 5, 6.

The space within the generator-absorber casing 1 above the level of the liquid 16 is connected to a Bourdon tube 74 in turn connected by a link 75 to a gravity rock arm 76 carried by the valve 6. In the path of the gravity rock arm 76 is an arm 77 fast to a movable valve member 78 within the valve 6. The arm 77 is under the normal control of a spring 79 tending to hold the valve member 78 in the open position. When, however, the Bourdon tube 74 is actuated to an extent to push the arm 76 beyond the center of gravity, it will fall upon the arm 77, and overcoming the spring 75 close the valve member 78, thus shutting off the supply of gas to the burner 3, even though the valve 7 be in the open position. When the weighted arm 77 once falls it remains in that fallen position until raised and reset by hand. When the arm 77 is thus raised, the valve 78, being relieved of the superior weight of the said arm, is free to open. The Bourdon tube 74 is to be taken as an example of any suitable means whereby abnormal pressure within the casing 1 will cause the closing of the valve 78.

The products of combustion from the burner 3 after passing through any suitable communicating duct (not shown) from the interior of the base 2 into the sheath 12 find escape through a flue 80 to a chimney or other point of disposal, the flue 80 being shown in Fig. 2.

Figure 10:
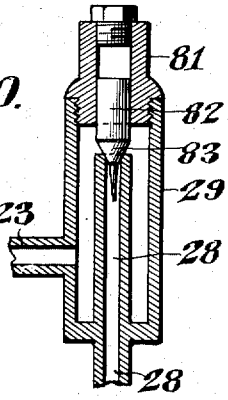

The check valves 27, 29 and 30 are all of similar construction, and one of these valves, say, the valve 29, is shown separately in Fig. 10. The valve 29 comprises a casing entered at one end by the pipe 28 and at the other end by a plug 81. The pipe 28 rises into the valve 29 for a considerable distance and above the pipe 23. The plug 81 contains a movable valve member 82 having a reduced end 83 entering the upper end of the pipe 28 so as to close the latter against fluids tending to enter the casing 29 through the pipe 23. In this way fluids may enter the check valve through the pipe 28 and escape through the pipe 23, but cannot flow in the return direction.

Figure 3:
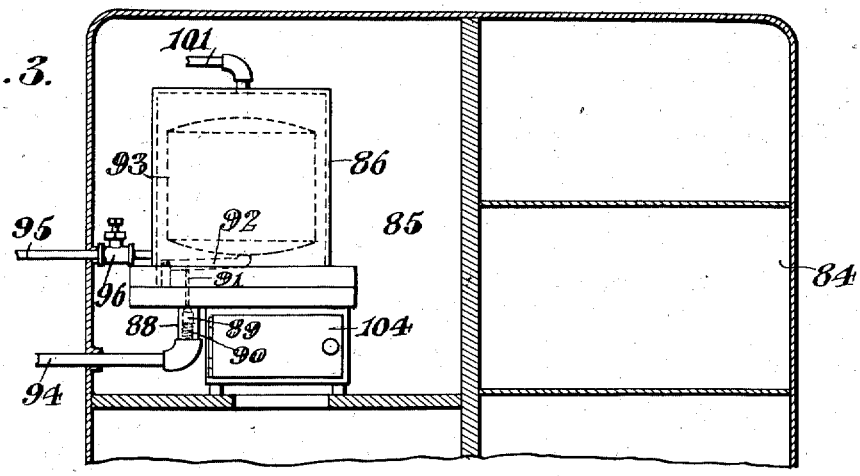
Fig. 3 is a more or less schematic section of a refrigerator with the refrigerating chamber, associated with the structure of Figs. 1 and 2, installed therein.

In Fig. 3 there is shown more or less schematically a refrigerator 84 such as may be used in households or in hotels or the like, and may represent any approved type of refrigerator for the purpose. It is customary in such refrigerators to have an ice chamber 85, and such ice chamber may be utilized for refrigerating purposes by having therein certain devices whereby the refrigerating structure of Figs. 1 and 2 may be employed. Within the chamber 85 there is located a casing 86 provided with a bottom member 87 through which there extends a nipple 88 bored out to provide a receptacle for a valve 89 urged to seat toward the casing 86 by a spring 90 within the nipple 88. The valve 89 is provided with a stem 91 rising into the casing 86 and there connected to an arm 92 in the path of a float 93 within the casing 86. Leading from the end of the nipple 88 remote from the casing 86 is a pipe 94 leading into the interior of the casing 33 through the bottom thereof. Connected to the casing 86 at any convenient point is another pipe 95 including a valve 96 and connected to a coupling 97 in a pipe 98 leading to and entering the casing 1 near the bottom thereof by way of a pipe 99 which within the casing 1 has a perforated portion 100 arranged to discharge into the interior of the casing 1. Connected to the top of the casing 86 is a pipe 101 leading through connected check valves 102, 103 to the pipe 98. The check valves 102 and 103 may be of the same construction as the check valve 29.

Within the chamber 85 and associated and connected with the casing 86 is a chamber 104 provided for the purpose of freezing small quantities of ice for table purposes.

On starting up the apparatus, a suitable quantity of ammonia water of requisite strength is placed within the casing 1, the casing or chamber 33 being assumed to be empty with the float 39 in the lowermost position. Under these circumstances the gas valve 7 is open and, as the safety valve 6 is always open except under abnormal conditions, gas flows to the burner 3 and is ignited by the pilot flame issuing from the burner 4. The water control valve 65 is also open and the cooling coil 13 of the generator-absorber is consequently cut out from the water circulating system. The thermostatically controlled water supply valve 37, is of course closed at the outset of this operation, but as soon as the ammonia liquid in the generator-absorber is heated to say 150° F.—which is very soon after the gas is turned on—the valve 37 is opened and the water circulation established. That portion of the ammonia water within the coils 8 and 10 is heated by the gas flame, thereby setting up a circulation which ultimately heats all the liquid 16, driving off ammonia gas therefrom, which gas may and usually does include more or less watery vapor. The ammonia gas rises in that portion of the casing 1 above the liquid containing portion, and striking the deflectors 17 and passing through the coils 18 is cooled sufficiently to condense the watery vapors, so that they drop back into the liquid containing portion of the casing 1. The anhydrous ammonia gas now leaves the casing 1 by way of the pipe 26 and 28 and check valves 27 and 29 and enters the coil 23 enclosed in the sheathing 24 where the pipe or coil 23 is subjected to the cooling action of water flowing through the duct 25. The ammonia gas is thereby cooled and flows in liquid form into the chamber 33 where it accumulates until in sufficient quantity to raise the float 39 to an extent causing it to rock the arm 48 sufficiently to close the valve 7, and thus shut off the supply of gas to the burner 3, and at the same time to close the valve 65 and thus include the cooling coil 13 of the generator-absorber in the water circulating system.

This chills the water 16 in the absorption tank or chamber creating vacuum or subatmospheric conditions therein. The condensed and liquefied ammonia flows from the casing 33, constituting the receiving chamber, by way of the pipe 94 to the expansion chamber within the casing 86 where it ultimately raises the float 93 sufficiently to permit the valve 89 to close, and further permitting such accumulation of liquid ammonia in the receiving chamber 33 to cause the cutting off of gas and the accumulation of liquefied ammonia in the receiving chamber 33 to set up the conditions already named. When the water in the absorption chamber becomes sufficiently cool and subatmospheric conditions are established in the casing 1, such subatmospheric conditions also become established in the casing or chamber 86, whereupon the liquefied ammonia therein evaporates and expands, and by such evaporation chills the chamber 85 and all parts in refrigerating communication with the chamber. The evaporated ammonia naturally flows toward the absorption chamber and in the form of a gas enters the water 16 through the perforations 100 of the pipe 99, being thus distributed through the water 16 so as to be absorbed thereby. Ultimately the accumulated supply of liquefied ammonia becomes exhausted to a sufficient extent to cause the dropping of the float 39 far enough to return the arm 48 to the first position, thereby opening the valve 65 and thus shutting off the flow of water through the coil 13 and at the same time opening the gas valve 7. When the water 16 becomes cool after the shutting off of the gas supply and the extinguishing of the flame at the burner 3, the cooling of the liquid 16 so reduces the temperature at the thermostat 73 that the valve 37 becomes closed and the flow of cooling water through the coils 34 and 18 and 25 ceases, there then being no reason for a continuance of the flow of cooling water.

In actual practice with an apparatus in which the depth of the liquid 16 as represented in the drawings was about fourteen inches, the process of distillation takes from twenty-five to thirty minutes, while the cooling of the weak liquor in the absorption chamber by water flowing through the coil 13 requires but two or three minutes' time when the pressure in the absorption chamber represented within the casing 1 is below that of the expansion chamber 86. The float 93 and valve 89 maintain a constant level of ammonia in the chamber 86, thus drawing ammonia from the supply within the chamber 33 only as rapidly as the ammonia expands in the chamber 86. The evaporation in an apparatus like that described and of the size intimated is accomplished in about sixteen hours, when the weighted arm 47 is tipped back to the first position and the cycle of operations is repeated.

Should the pressure in the casing 1 exceed a predetermined limit, say, 200 pounds, per square inch, the valve 6 is automatically closed and the supply of gas is cut off, the valve remaining positively closed thereafter until again opened by hand. The distilling process is so short that frost formed on the chamber 86 does not melt, the rise in temperature being only from one and one-half to three degrees F. The various parts subjected to pressure are all made to withstand the highest pressure with an ample margin of safety.

The pressure which it has been found necessary to maintain in order to bring about the liquefaction of the ammonia gas and the temperature to which it is necessary to raise the rich liquor during the distilling period varies in accordance with atmospheric temperatures. It may be necessary during hot weather, and when the cooling water is naturally higher than at other times, to employ a condensing pressure of from 170 to 175 pounds, and to raise the temperature of the rich liquor during the distilling period to about 263°. These amounts, however, vary in accordance with conditions.

The valve 96 is normally closed, but is provided for the purpose of draining the expansion tank of ammonia should it be necessary or desirable.

No attempt has been made to show any heat insulating material, but it will be understood that such material may be employed wherever it may be needed.

This application is a continuation in part of my application No. 75,374 for a refrigerating apparatus filed January 31, 1916.

Having described my improvements and the best way now known to me of carrying the same into practical effect, I state in conclusion that I do not limit myself to the structural details hereinbefore described and shown in the accompanying drawings in illustration of my invention since manifestly the same can be considerably varied without departure from the spirit of my invention; but

What I claim herein as new and desire to secure by Letters Patent is as follows:

1. A refrigerating apparatus comprising an absorption chamber for containing ammonia water and provided with a continuation for receiving ammonia gas distilled from the ammonia water, separate cooling means in the water containing portion of the absorption chamber and in the gas-receiving portion of the absorption chamber, heating means for the absorption chamber, a collecting chamber for liquefied ammonia connected to the ammonia gas receiving portion of the absorption chamber, controlling means for the cooling means and for the heating means, thermo-responsive means in the absorption chamber for controlling the flow of cooling medium in the cooling means for chilling the distilled ammonia gas, and means responsive to the level of accumulated liquid ammonia in the collecting chamber for controlling the supply of heating medium to the heating means and the flow of cooling medium through the cooling means in the absorption chamber.

2. In a refrigerating apparatus, an absorption chamber for containing ammonia water and provided with a continuation for receiving ammonia gas evaporated from the ammonia water, heating means for causing the evaporation of the gas from the ammonia water, means for supplying fuel to the heating means, chilling means in the gas-receiving part of the absorption chamber, a collecting chamber for liquefied ammonia, other cooling means in the path of the gas from the absorption chamber to the collecting chamber, and means for controlling the heating medium flowing to the heating means and the cooling medium for chilling the distilled gas, said controlling means being associated with the collecting chamber and responsive to variations in level of liquefied ammonia gas in said collecting chamber.

3. In a refrigerating apparatus, an absorption means comprising a casing with a cooling coil therein, means for heating liquid within the casing, baffles in the casing in the path of gas distilled from the liquid, and other cooling coils interspersed with the baffles.

4. In a refrigerating apparatus, an upright casing having heating means associated therewith, separate cooling coils in the upper and lower portions of the casing, and baffles in the upper part of the casing.

5. In a refrigerating apparatus, an upright casing having heating means at the lower end, cooling means in the lower portion of the casing, other cooling means in the upper portion of the casing, and means in the upper portion of the casing associated with the cooling means therein for directing gas distilled from liquid within the casing to move in a tortuous path.

6. In a refrigerating apparatus, an upright casing provided with an absorption chamber in its lower portion and a gas-receiving chamber in its upper portion, cooling means located in the absorption chamber portion of the casing, other cooling means in the upper portion of the casing, and cooling means exterior to the casing and including means for conveying gas from the casing, said last named cooling means being located above the casing.

7. A refrigerating apparatus comprising an absorption and distilling means, cooling means for the absorption portion of the apparatus, other cooling means for the distillate, means responsive to pre-determined temperature conditions in the absorption portion of the apparatus for controlling the cooling means for the distillate to condense the distillate into liquid form, and means responsive to accumulations of liquefied distillate to control the cooling means of the absorption portion of the apparatus.

8. A refrigerating apparatus of the intermittent absorption type comprising a generator-absorber; means for condensing the ammonia gas generated thereby; a receiver for the liquefied ammonia from said condenser; a burner and gas supply therefor for heating the generator-absorber; a water circulating system for cooling the ammonia condensing means; a cooling coil in the liquid containing portion of the generator-absorber included in a by-pass from the cooling water circulating system; and means responsive to variations in the level of the ammonia liquid in the receiver for turning on or off the gas supply and simultaneously therewith throwing the by-pass including the cooling coil in the generator-absorber out of, or into, circuit with the cooling water circulating system, according as the generator-absorber is acting as a generator or as an absorber, substantially as hereinbefore set forth.

9. In combination with the elements specified in the last preceding claim, thermostatically controlled means, responsive to variations in the temperature of the liquid in the generator-absorber for automatically cutting off the water supply from the cooling water circulating system whenever and so long as the temperature of the liquid in the generator-absorber falls below a predetermined limit, substantially as and for the purpose hereinbefore set forth.

10. Refrigerating apparatus comprising in combination a refrigerant circuit including a generator absorber, means for heating the generator absorber, a conduit for supplying energy to the heating means, means for opening and closing the conduit in response to the conditions of the refrigerant circuit, an emergency shut-off means in the conduit, means responsive to abnormal conditions within the generator absorber and operating to close the emergency shut-off means, and means requiring the emergency shut-off means to remain closed until released by hand.

11. Refrigerating apparatus comprising in combination a refrigerant circuit including a generator absorber, means for heating the generator absorber, a conduit for supplying energy to the heating means, means for opening and closing the conduit in response to the condition of the refrigerant circuit, an emergency shut-off means in the conduit, pressure responsive means operative to close the emergency shut-off means when the pressure within the generator absorber exceeds a predetermined limit, and means requiring the emergency shut-off means to remain closed until released by hand.

12. Refrigerating apparatus comprising in combination a refrigerant circuit including a generator absorber, a burner for heating the generator absorber, a fuel supply conduit for the burner, a valve for turning on and off the fuel in response to the condition of the refrigerant circuit, an emergency shut-off valve in the conduit for turning on and off the fuel, means responsive to abnormal conditions within the generator absorber and operating to close the emergency valve, and means for locking the emergency valve closed until released by hand.

13. Refrigerating apparatus comprising in combination a refrigerant circuit including a generator absorber, a burner for heating the generator absorber, a fuel supply conduit for the burner, a valve for turning on and off the fuel in response to the condition of the refrigerant circuit, an emergency shut-off valve in the conduit for turning on and off the fuel, means responsive to the pressure within the generator absorber and operating to close the emergency valve when the presure exceeds a predetermined limit, and means for locking the emergency valve closed until released by hand.

14. Refrigerating apparatus comprising in combination a refrigerant circuit including a generator absorber, means for heating the generator absorber, a conduit for supplying energy to the heating means, means for opening and closing the conduit in response to the condition of the refrigerant circuit, an emergency shut-off means in the conduit, means responsive to abnormal conditions within the refrigerant circuit and operating to close the emergency shut-off means, and means requiring the emergency shut-off means to remain closed until released by hand.

15. Refrigerating apparatus comprising in combination a refrigerant circuit including a generator-absorber, a burner for heating the generator-absorber, a gas supply pipe for the burner, a valve for turning on and off the gas in response to the condition of the refrigerant circuit, an emergency shut-off valve in the pipe for turning on and off the gas, means responsive to abnormal conditions within the generator-absorber and operating to close the emergency valve, and means whereby the emergency valve, when once closed, is automatically locked in that position until released by hand.

16. Refrigerating apparatus comprising in combination a refrigerant circuit including a generator-absorber, a burner for heating the generator-absorber, a gas supply pipe for the burner, a valve for turning on and off the gas in response to the condition of the refrigerant circuit, an emergency shut-off valve in the pipe for turning on and off the gas, means responsive to the pressure within the generator-absorber and operating to close the emergency valve when the pressure exceeds a predetermined limit and means whereby the emergency valve, when once closed, is automatically locked in that position, until released by hand.

17. Refrigerating apparatus comprising in combination a refrigerant circuit including a generator absorber, means for heating the generator absorber, a conduit for supplying energy to the heating means, means for opening and closing the conduit in response to the conditions in the refrigerant circuit, an emergency shut-off means in the conduit, means for automatically closing the emergency shut-off means before or when the temperature of the generator absorber reaches a predetermined high value, and means requiring the emergency shut-off means to remain closed until released by hand.

18. Refrigerating apparatus comprising in combination a refrigerant circuit including a generator-absorber, a burner for heating the generator-absorber, a gas supply pipe for the burner, a valve for turning on and off the gas in response to the condition of the refrigerant circuit, an emergency shut-off valve in the pipe for turning on and off the gas, means for automatically closing the emergency valve before or when the temperature of the generator-absorber reaches a predetermined high value, and means whereby the emegerncy valve when once closed is automatically locked in that position until released by hand.

In testimony whereof I hereto affix my signature.

OTTO E. BORNHAUSER.